(12) United States Patent
Blanc et al.

(10) Patent No.: US 6,411,599 B1
(45) Date of Patent: Jun. 25, 2002

(54) FAULT TOLERANT SWITCHING ARCHITECTURE

(75) Inventors: Alain Blanc, Vence; Sylvie Gohl, La Colle sur Loup; Michel Poret, Gattieres, all of (FR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/204,394

(22) Filed: Dec. 2, 1998

(30) Foreign Application Priority Data

May 29, 1998 (EP) .............................................. 98480040

(51) Int. Cl.[7] .............................................. H04L 1/22
(52) U.S. Cl. ...................................... 370/219; 370/220
(58) Field of Search ................................ 370/217, 216, 370/218, 219, 220, 221; 379/279, 220, 221, 269; 340/827, 825.16; 714/12, 13, 6

(56) References Cited

U.S. PATENT DOCUMENTS

| | | | | |
|---|---|---|---|---|
| 5,222,063 A | * | 6/1993 | Foglar et al. ............... | 370/220 |
| 5,426,420 A | * | 6/1995 | Nagler ................... | 340/825.01 |
| 5,467,347 A | * | 11/1995 | Pettersen .................... | 370/230 |
| 5,740,157 A | * | 4/1998 | Demiray et al. ............. | 370/219 |
| 5,848,128 A | * | 12/1998 | Frey ............................... | 379/9 |
| 5,909,427 A | * | 6/1999 | Manning et al. ............. | 370/219 |
| 6,148,415 A | * | 11/2000 | Kobayashi et al. ........... | 714/15 |
| 6,226,261 B1 | * | 5/2001 | Hurtta et al. ................ | 370/219 |

* cited by examiner

*Primary Examiner*—Douglas Olms
*Assistant Examiner*—Ken Vanderpaye
(74) *Attorney, Agent, or Firm*—Scott W. Reid

(57) ABSTRACT

A fault tolerant switching architecture is provided with two separate switch fabrics each having a switch cure located in a centralized building and a set of SCAL elements distributed in different physical areas. Each SCAL element has both a SCAL receive element and a SCAL transmit element for access to a corresponding input and output port of the swatch core. A set of port adapters is distributed at different physical areas, with each connected switch fabrics via a particular SCAL element so that each switch core receives the sequence of cells coming from any port adapter and conversely any port adapter may receive cells from either one of the switch cores. Each switch fabric can detect an internal breakdown condition occurring in one of its element and send an error control signal to the peer element located in the other switch fabric. Each switch core extracts the Switch Routing Header (SRH) from the cells entering the switch core, and a routing table for obtaining a bit map value that indicates the output ports to which the cell should be routed. An additional controllable masking mechanism is used for altering the value of the bit map in response to the detection of the error control signal from the peer switch core. The routing process is then performed with the altered value of the bitmap.

6 Claims, 7 Drawing Sheets

FAULT TOLERANT SWITCHING ARCHITECTURE

TECHNICAL FIELD OF THE INVENTION

The invention relates to telecommunications and more particularly to a fault tolerant switching architecture.

BACKGROUND ART

Switching systems are taking an essential place in telecommunication networks. The first switches were based on cross-connect techniques providing the capability of switching at high rates.

The introduction of Asynchronous Transfer Mode (ATM) for multimedia applications mixing voice, data and video, as well as the development of electronic business and transaction equipment revealed the interest in switching architectures capable of handling small packets of data. In this respect, shared buffer techniques permit associating a high switching rate while handling the small packets of data. Basically, in this shared buffer switching technique, a central buffer is used for storing the messages which are received from the input ports of the switch before they are re-routed towards the appropriate output ports. Each output port of the switch is associated with an output queue which stores the succession of addresses corresponding to the location of the different messages loaded in the buffer, prior to their extraction and delivery to the considered output port. The queuing process is located at the output level of the switch, which eliminates the "head of line blocking" drawback and also facilitates multi casting capabilities. Shared buffer switches can be enhanced by means of speed expansion and port expansion mechanisms. Examples of such shared buffer techniques can be found in the non-published European Patent Applications No. 97480057.5, 97480056.7, 97480065.8, 96480129.4, 96480120.3 assigned to the assignee of the present application (IBM Docket FR996040; IBM Docket FR996042; IBM Docket FR996043; IBM Docket FR996044; IBM Docket FR996045) which are herein incorporated by simple reference. Additional prior art documents relating to shared buffer switching techniques can be found in non-published European Patent Applications No. 97480100.3 (IBM Docket FR997047), No. 97480098.9 (IBM Docket FR997048), No. 97480101.1 (IBM Docket FR997049), No. 97480099.7 (IBM Docket FR997050), No. 98480007.8 (IBM Docket FR 997053) and No. 98480006.0 (IBM Docket FR997055).

Whatever the particular technique being used, the traditional cross-connect or the newly developed shared buffer technique, switching systems should incorporate some kind of fault tolerant mechanisms which provide them with the capability of ensuring a continuous switching process even in case of an abnormal condition. Telecommunication suppliers have provided recommendations for introducing mechanisms in telecom systems for minimizing the effects on the data of the occurrence of abnormal situations. A Bellmore recommendation specifies that, in case of a breakdown in one element of a switching equipment, the error data conveyed through that equipment should not exceed 50 milliseconds, while the data which are not conveyed through the equipment should not be impacted. Considering the example of a component attached to a particular port of a switch that falls in a breakdown condition, it is recommended that the data cells entering into the switch via the other ports should not be affected by the breakdown, while the particular data which should enter that port should be re-routed in less than 50 milliseconds.

SUMMARY OF THE INVENTION

The main object of the present invention is therefore to design a switching architecture, based on cross-connect or shared buffer technique, having fault tolerant mechanisms providing high availability of the switching resources.

It is also an object of the present invention to provide a switching architecture having the capability for automatic detection of error conditions occurring in one element of the architecture, and further including mechanisms for re-establishing the switching resources.

It is another object of the present invention to provide a breakdown detection and traffic reestablishment mechanism that is particularly well suited for the shared buffer switches and permits port expansion and buffer expansion capability.

These and other objects of the present invention are attained with the fault tolerant switching architecture which includes a first and a second switch fabric including a first and a second switch core, respectively, located in a centralized building and a set of Switch Core Access Layer (SCAL) elements distributed in different physical areas. Each SCAL element contains a SCAL receive element and a SCAL transmit element for respectively permitting access to a corresponding input and output port of the switch core. A set of port adapters is distributed at different physical areas, and each is connected to the first and second switch fabrics via a particular SCAL element so that each switch core receives the sequence of cells coming from any port adapter and conversely any port adapter may receive data from either one of the first or second switch cores. Each switch fabric includes means for detecting an internal breakdown condition occurring in one of its components and means for transferring an error control signal to the peer element located in the other switch fabric.

Preferably, in each switch core there is provided means for extracting the Switch Routing Header (SRH) from the cell entering into the switch core, and means for addressing a routing table with the contents of the SRH for getting a bit map value representing the output ports to which the cell should be routed. An additional controllable masking mechanism is used for altering the value of the bit map in response to the detection of the error control signal from the peer switch core. The routing process is then performed with the altered value of the bit map.

In a preferred embodiment, the masking mechanism is also controlled by the value of a Filtering Control field which is extracted from the SRH contained in every entering cell, and each SCAL receive element includes means for altering the value of the Filtering Control field in response to the detection of an error control signal received from the peer SCAL receive element.

In a preferred embodiment of the invention, an 8B/10B coding scheme is used for the introduction of additional error detection capability.

DESCRIPTION OF THE PREFERRED EMBODIMENT OF THE INVENTION

Figure 1:
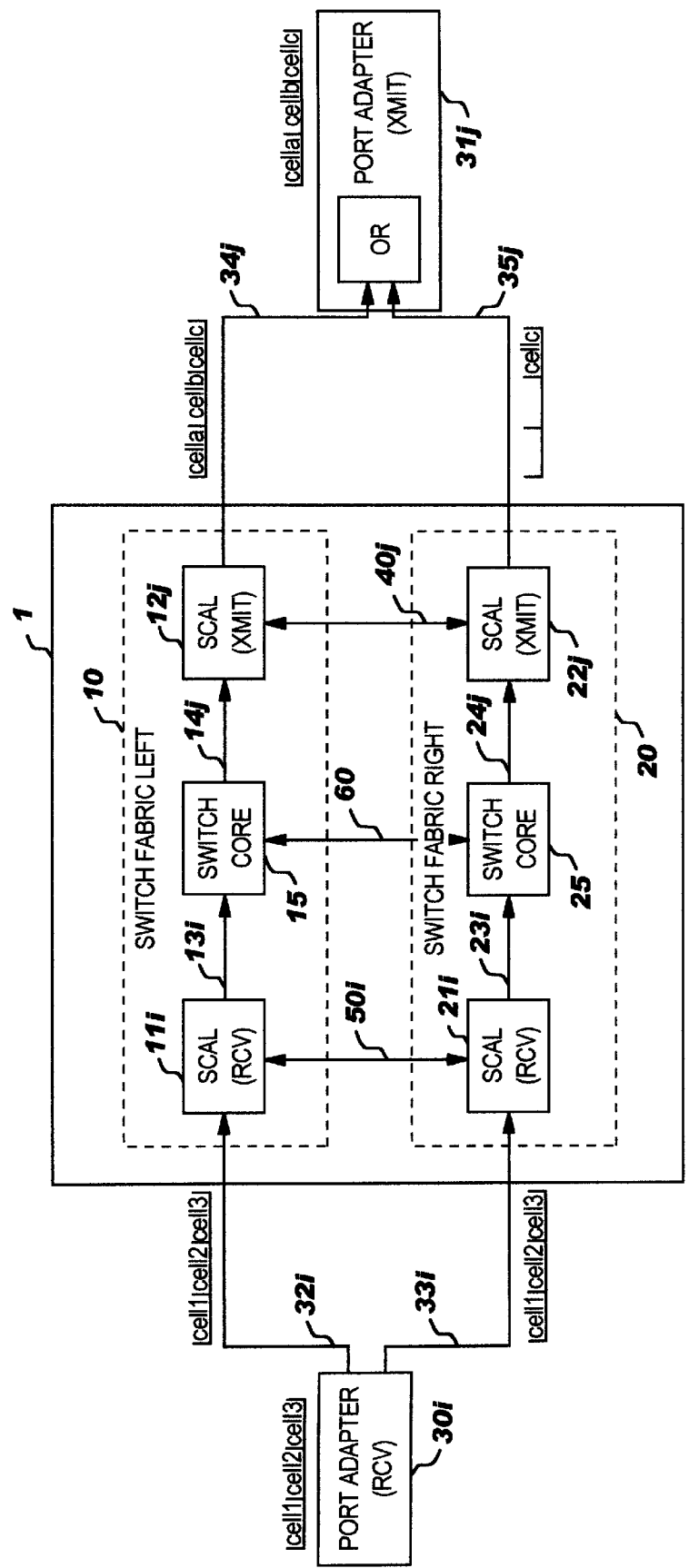
FIGS. 1, 2 and 6 illustrate the basic architecture of the invention using two shared buffer switching structures.

With respect to FIG. 1, there is shown a switch fabric in accordance with the present invention. Each element of one path, e.g. the left path, is associated with a peer element intended to be used as a backup in case of individual breakdown.

For instance, SCAL receive element 11-$i$ of the left switch fabric 10 is connected to the SCAL receive element 21-$i$ of the right switch fabric by means of bus 50-$i$, and, similarly, the switch core 15 is connected to the switch core 25 by means of bus 60.

More particularly, bus 50-$i$ comprises two In_Service control signals having opposite directions, and two data lines that are also of opposite directions. In the preferred embodiment of the invention the data lines are so designed as to transport HDLC messages, so as to facilitate the direct implementation of the electronic circuits.

It should be noted that every basic unit, e.g. SCAL receive element 11-$i$, or switch core 15 or 25, or SCAL transmit elements 12-$j$ or 22-$j$, is fitted with appropriate checking circuits, based on a processing unit and associated with hardware components, in order to detect the occurrence of a malfunction or a breakdown.

For instance, each SCAL receive element includes a processor having means for performing an auto-diagnosis, for instance a background diagnostic. Additionally, the element may be fitted with some kind of watchdog restart mechanism which is used for generating a general reset of the processor if the processor happens to be in a hang-up situation, characteristic of a malfunction. Also, the processor is programmed to verify any ASIC elements by checking that the hardware error detection mechanisms are not triggered, and by testing any incoming bus. For instance, on buses 13-$i$, 14-$j$, 23-$i$ and 24-$j$ the preferred embodiment of the invention uses a redundant 8B/10B coding scheme for performing the error determination.

The error detecting mechanism may also use so-called "keep alive" messages that permit the transmitting, by any element, of messages which are regularly awaited by other elements in the switching structure, and the absence of which will be interpreted by the latter as characterizing a breakdown.

It should be noted that the error detecting mechanisms may vary, and may change in accordance with the particular requirements and performance desired by the switch manufacturer. The essential feature is that each component in the switching structure includes an error detecting mechanism.

The invention is enhanced by the use of the different busses mentioned above, which may report the error detection status to the peer element. For instance, bus 50-$i$ is fitted with an In_Service control lead that reports an indication of the status of the SCAL receive element 11-$i$. This is achieved by any electrical attributes that can inform the peer corresponding element—SCAL receive element 21-$i$—of the occurrence of the error. In the preferred embodiment of the invention, the In_Service control lead is so designed as to fall on a predetermined voltage when any one of the following conditions occur:

a detection of an error by the control processor of the SCAL receive element 11-$i$;

a detection of an error by the above mentioned watchdog mechanism;

a power supply failure;

a card removal; etc.

However, any other electrical attribute—e.g. the frequency of a voltage—can be used for the determination of the error condition. In addition, it should be noted that this list of error conditions may be extended in accordance with the degree of sophistication of the switching architecture being required.

Similarly, bus 50-$i$ is fitted with a In-Service control lead which can be used for the SCAL receive element 21-$i$, and interpreted by the latter in order to determine the status of its associated peer element.

The same arrangement is provided in bus 60, so that any switch core may be informed of the occurrence of an error condition in the peer switch core. For that purpose, bus 60 comprises a first In-Service control lead that is used for interpretation by switch core 15 of the status of switch 25, and a second In-Service control lead which is received by switch core 25 for the checking of the status of switch core 15.

It should be noted that the errors that might occur in the different elements have different effects. Obviously, an error occurring in the SCAL receive element 11-$i$ has some drastic effect on the data path or the data control, and is reported via the corresponding In_Service control lead to the peer SCAL receive element 21-$i$. However, an error occurring in one switch core, e.g. core 15, might only affect one unique port, while allowing the routing of the cells through the 15 remaining ports, in the case of a 16-port switch core. In the preferred embodiment of the invention multiple data leads are used in bus 60 for transporting signaling messages to permit distinguishing errors that can be interpreted by the peer switch core as a particular breakdown on one given port. Additionally, active SCAL transmit (Xmit) elements 12-$j$ and 22-$j$ communicate and transmit error conditions via a bus 40-$j$.

Figure 2:
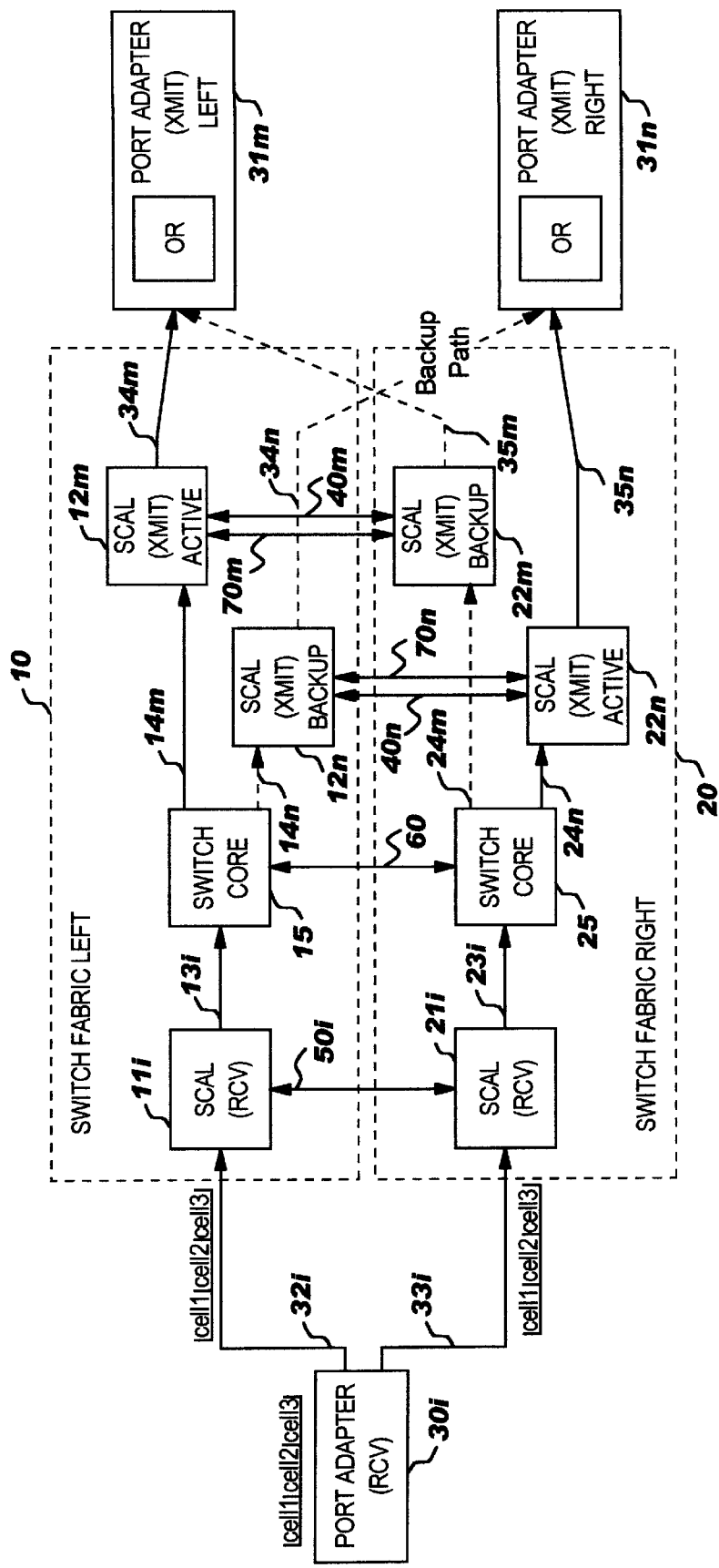

With respect to FIG. 2 the structure of the switching architecture is illustrated. Basically, the invention uses a reparation of the output ports of the switch subsystem 1, and the Xmit adapter elements in two groups: a left group that will be assigned to switch fabric 10 and will normally receive the traffic cells from this switch fabric; a right group that is assigned to the switch fabric 20 and which normally receives the traffic cells from this switch fabric. In the preferred embodiment of the invention, the continuous availability is achieved with two separate left and right switch fabrics. However, it should be noted that the system could be enhanced further by increasing the number of switching paths.

In the figure the port adapter Xmit 31($m$) is assigned to the left group while the port adapter Xmit 31($n$) is included in the right group. Additionally, each switch fabric path, e.g. switch fabric 10, comprises SCAL Xmit elements that are divided into two groups—so called active and backup corresponding to the reparation previously made of the port adapter Xmit elements. More particularly a port adapter Xmit 31($m$)—that belongs to the left group (assigned to the left switch path) is physically connected to a corresponding SCAL Xmit element 12($m$) that belongs to the active group of the switch fabric 10; and is further physically connected to a corresponding SCAL Xmit element 22($m$) which belongs to the backup group of the switch fabric 20.

Similarly, the port adapter Xmit 31($n$) that belongs to the right group assigned to the right switch path is physically connected to a corresponding SCAL Xmit element 22($n$) that belongs to the active group of the switch fabric 20; and is further physically connected to a corresponding SCAL Xmit element 12(*n*) which belongs to the backup group of the switch fabric 10.

The above described distribution of the port adapter Xmit elements permits an effective and simultaneous operating of the switch cores 15 and 25. During the normal traffic, the arrangement of the port adapter Xmit, decided by the node manager, results in that the cells that are to be propagated to the port adapter Xmit 31(*m*) (belonging to the left group) will be conveyed through left switch core 15, to the SCAL Xmit element 12(*m*), while the same cell is duplicated by the port adapter receive 30(*i*) and will be dropped by the switch core 25. Conversely, the cells that are to be propagated to the port adapter Xmit 31(*n*) (belonging to the right group) will be conveyed through right switch core 25, to the SCAL Xmit element 22(*n*), while the same cell being duplicated at the level of the port adapter receive 30(*i*) will be dropped by the switch core 15. Therefore, the cells are being distributed through the two right and left switch fabrics in accordance with the distribution that was determined by the node manager.

This is achieved as followed:

In the best mode of the invention, the cells which are generated by the port adapter receive 30i are duplicated on the two serial links 32(*i*) and 33(*i*). It should be noted that this duplication is propagated up to the input of the switch cores 15 and 25. This is very important because the two cores must receive the same cells so as to make sure that the control cells are also simultaneously received. As described in the European patent applications mentioned above, the switch core uses routing tables which provide the bit map information that is used inside the core for controlling the routing process. That bit map information is generally read from the contents of routing control tables that can be updated by means of control cells. This is the reason why it is important, in this invention, that the same cells arrive at the input of each switch core. More particularly, as described in the above mentioned patent applications, port adapter receive 30(*i*) generates a cell which comprises a Switch Routing Header (SRH) and a payload; the SRH including a two-byte Routing Label characteristic of the destination of the cell, that is to say the port adapter Xmit in case of unicast connection or the set of port adapter Xmit in case of multi cast connection, as well as a one-byte Cell Qualifier. The cell is then received by the local SCAL receive element 11(*i*) and 21(*i*), which introduces an additional set of two bytes that will be affected to the location of the bit map that will be used for controlling the internal routing process inside the switch cores 15 and 25. The cells are then remotely transported to the centralized switch cores 15 and 25, each core including a routing control device that uses the routing label for addressing a routing control table that provides the appropriate two-byte bit map information that can then be used for the internal routing process inside the switch cores.

Figure 3A:
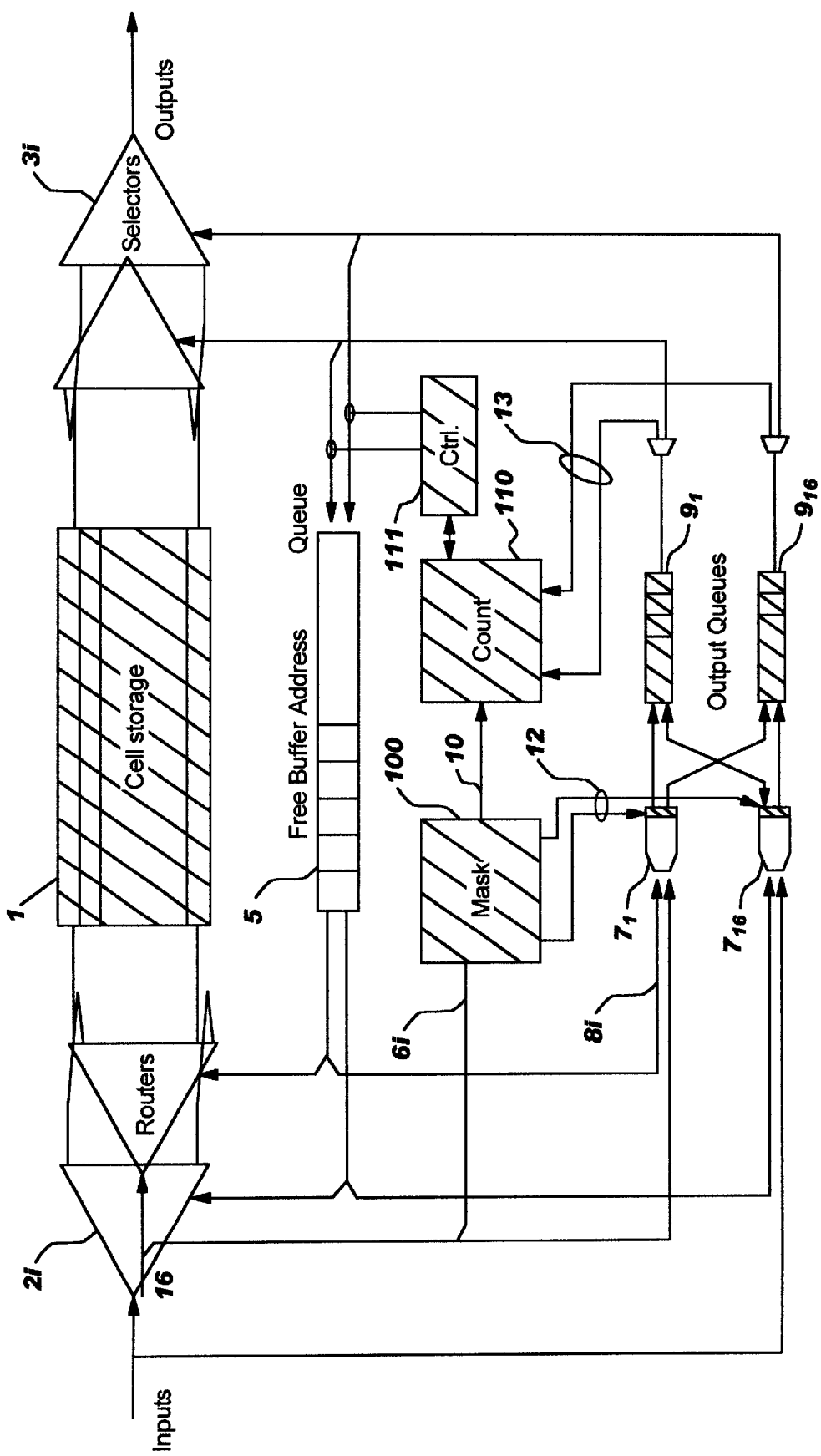
FIG. 3A illustrates a synoptic view of an internal structure of a self-routing switching module that can be used in the preferred embodiment of the invention.

In the teaching of the present invention, an additional mask mechanism is used inside each switch core, for processing the bit map provided by the routing control device before the latter is used for controlling the routing process. FIG. 3A is a schematic view of the structure of a switch core element forming the basis of the switch core 15 or 25. A set of 16 input ports can provide cells into a cell storage 1 via 16 corresponding routers 2-*i*. The cells can be extracted from the cell storage and transferred to the output ports via 16 selectors 3-*i*. When a cell is entered into the switch element, a free buffer address is retrieved from a Free Buffer Address Queue 5, and the incoming cell is routed to the appropriate location within the cell storage defined by the address that was extracted. Simultaneously, the switch routing header is extracted from the incoming cell and transmitted through a bus 6-*i* to a mask circuit 100. The mask circuit 100 uses the SRH value provided in order to generate a corresponding 2 byte mask value which will be provided to a set of 16 gating systems (only gating system 7-1 and 7-16 being illustrated). At the input of the gating systems 7-*i*, via bus 8-*i*, there is presented the address where the cell is being loaded within cell storage 1. That address is loaded into one or more Output Queues 9-1 to 9-16 corresponding to the appropriate output where the cell will have to be routed. When the cell is a multi cast cell, the mask circuit 100 provides the number of duplications of the cell to count circuit 110 via bus 10. The outgoing process involves the reading of an address in the Output Queue 9-*i*, corresponding to the storage address of the cell within cell storage 1. This address is then presented to the selector 3-*i* and the cell can be shifted to the appropriate output port.

Bus 13 permits the transmission of that address to the count circuit 110 which performs a decrementation operation corresponding to a single duplication of the cell. When the cell has been outputted to every appropriate output port, the result of the decrementation is zero, which releases the address that now becomes available for the storage of a new cell. At that moment, the released address can be loaded into the Free Address Queue 5 under control of circuit 111.

Figure 3B:
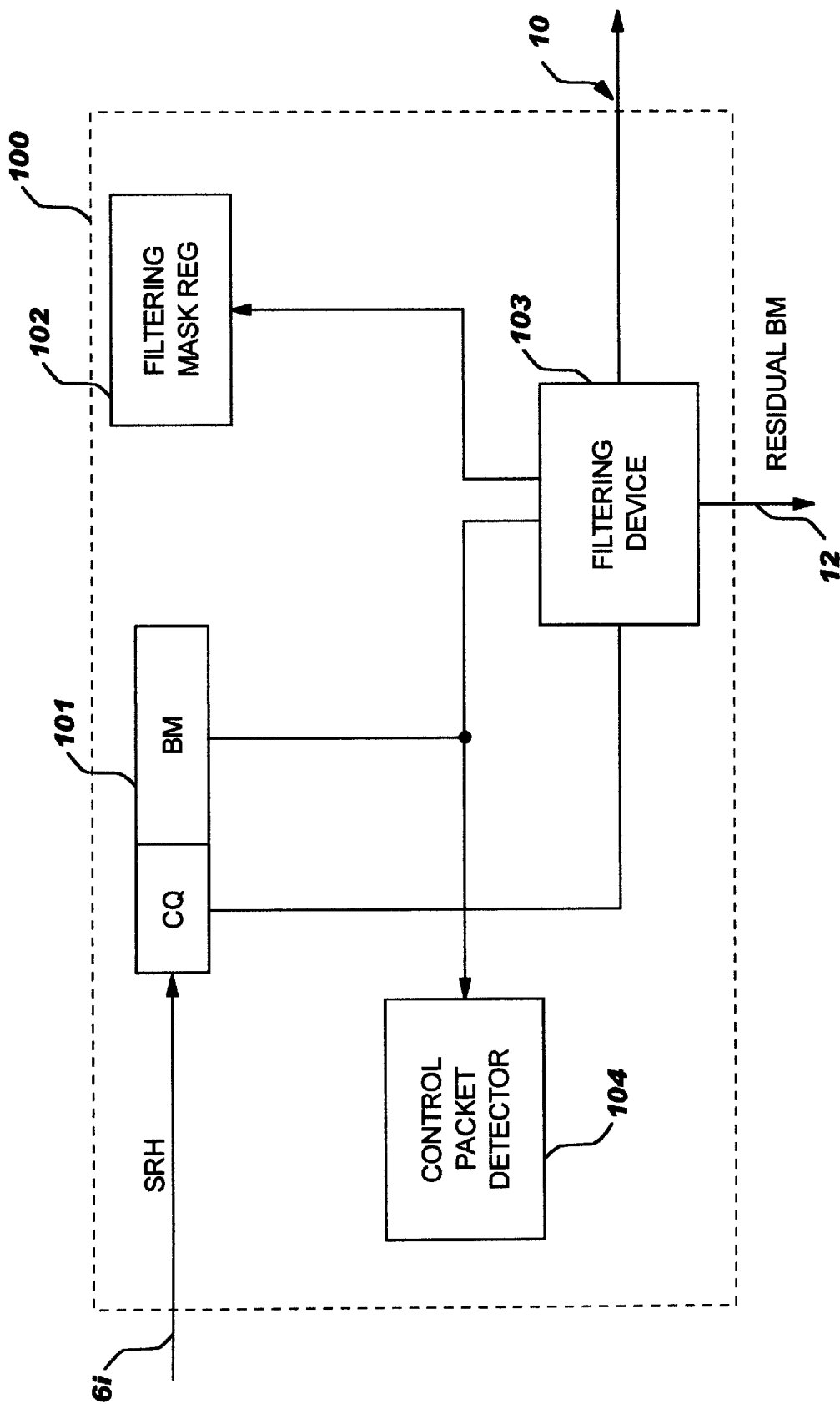
FIG. 3B illustrates a block diagram of the mask circuit used for performing the filtering control field process according to the invention.
Figure 4:
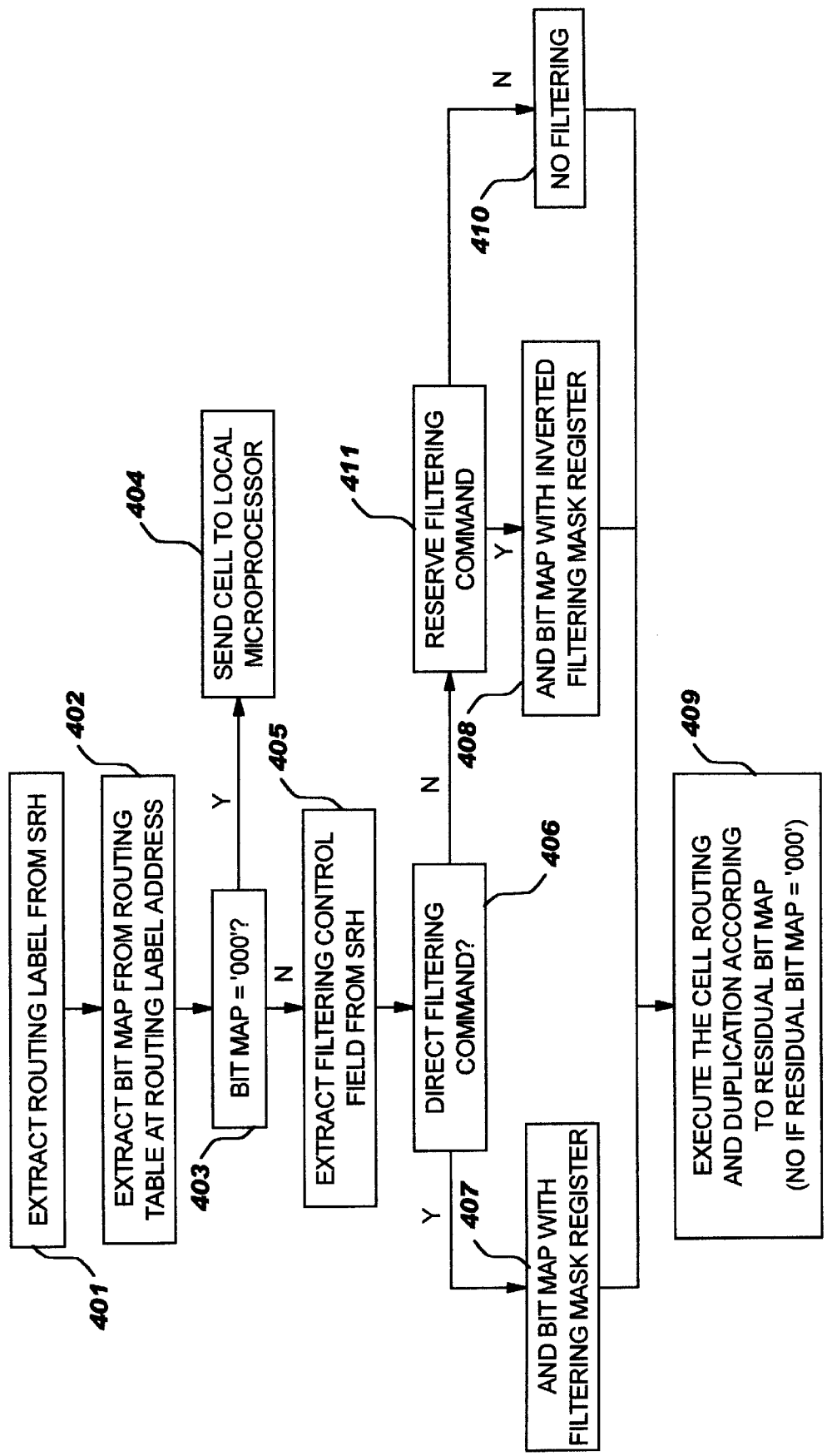
FIG. 4 is a flow chart describing the Filtering Control field process which is performed within each switch core.

With respect to FIG. 3B there is shown the preferred embodiment of the mask circuit 100 which is used for performing the steps 403 to 409 of the Filtering Control field process of FIG. 4. Basically, the SRH is loaded into a register 101 via a bus 6-*i*, and a filtering mask register 102 has been loaded by the control processor at the initialization of the circuit and contains the two-byte mask that characterizes the distribution of the output ports in the two left and right groups. The detection of the control packets (corresponding to step 403 of FIG. 4) is performed by circuit 104 which processes the contents of the bit map field of register 101. The Filtering Control field in the Cell Qualifier field is transmitted to the filtering device 103 with the value of the bit map and that of the filtering mask register 102. The filtering device can then provide the residual bit map that will be used by the gating circuits 7-1 to 7-16 so that the address of the cell being stored in cell storage 1 is loaded into the appropriate Output Queues 9-*i* in accordance with the bit map being carried by the cell, and processed in accordance with the mask register contents. This achieves the cell routing in accordance with the left and right distribution of the output groups that were decided by the node manager.

With respect to FIG. 4 there is shown the distribution process that is used for enabling the control of the two left and right switch cores. This process is performed in every switch core by mask circuit 100 as shown in FIG. 3B. The process in accordance with the present invention initiates with step 401 where the routing label which is contained inside the SRH is extracted from the arriving cell. Then, in step 402, the routing label is used for addressing the routing table located inside the switch core, in order to extract the bit map which is characteristic of the distribution of the considered cell to the appropriate output ports. It should be noted that, since the same cell is received by the two switch cores 15 and 25, step 402 causes the same value of bit map to be extracted. In step 403 a test is performed in order to determine whether the extracted bit map is equal to all zeros, which is, by convention, characteristic of a control cell which is destined to the local internal processor and so must be extracted from the flow of data in step 404. If the cell is not a control cell, the process proceeds to step 405 where a Filtering Control field process is initiated. For that purpose, the above mentioned Cell Qualifier comprises two particular bits forming a Filtering Control field which is characteristic of the nature of the filtering operation which is desired for this specific cell.

If the Filtering Control field is characteristic of a direct filtering operation, as determined by the step 406, then the process proceeds with step 407 where the bit map which was previously extracted is logically ANDed with the contents of the filtering mask register shown in FIG. 3. As mentioned above (with respect to FIG. 3), the filtering mask register is designed to store a mask value which is composed, in the preferred embodiment of the invention, of sixteen-bits, with each bit corresponding to one particular output port of the considered switch core. At the initialization of the switching architecture, as explained above, the port adapters Xmit were distributed in two right and left groups. Since the node manager is aware of the topology of the switching architecture, and particularly the physical correspondence between each port adapter Xmit—either left or right—and the output ports of each switch core, the value of the mask can be determined as follows for switch core 15: for each output port the corresponding bit of the mask is set to one when the SCAL Xmit element 12 has been determined to be active, that is to say is designed to transmit the normal flow of data to the considered port adapter Xmit. In other words, the bit of the mask that is assigned to a given output port of the switch core 15 is set to one when the left port adapter Xmit receives the cell from that specific port. On the contrary, when the SCAL Xmit element is known to be backup, the corresponding bit is set to a zero. Conversely, for switch core 25, the bit of the mask that is assigned to a given output port of that switch core is set to a one when the right port adapter Xmit receives the cell from that specific port. On the contrary, when the output port communicates with a SCAL Xmit element known to be backup, the corresponding bit is set to a zero.

It should be noted that the filtering mask register of the two switch cores 15 and 25 always contain mask values that are complementary, so as to ensure a perfect distribution of the cells through the two switch cores.

With respect to the process of FIG. 4 again, when the test of step 406 shows that the nature of the Filtering Control field is not characteristic of a direct filtering operation, the process proceeds with step 411. When the test of step 411 shows that the nature of the Filtering Control field is characteristic of a reverse filtering operation, the process proceeds with step 408. In step 408, the bit map which was previously extracted is logically ANDed with the inverted value of the filtering mask register. When the test of step 411 shows that the nature of the Filtering Control field is not characteristic of a reverse filtering operation the process proceeds to step 409 through step 410 (no filtering operation).

Step 409 is performed at the completion of either step 407 or 408 or 410. The residual bit map being masked in accordance with the above description is then used for controlling the internal routing of the cell inside the two switch cores, and also permits the appropriate duplication of the cells in case of multi casting. It therefore appears that, in case of a cell carrying a direct filtering command in its Filtering Control field, that the cell which is duplicated and provided to both switch fabric paths, is only transmitted (as a result of step 407) to the appropriate SCAL Xmit element which was determined by the node manager to be active. Conversely, for a cell carrying a reverse filtering command in its Filtering Control field, that cell which is duplicated and provided to both switch fabric paths, is only transmitted (as a result of step 408) to the appropriate SCAL Xmit element which was defined to be backup.

In the present invention, the direct filtering command is used for the normal data traffic while the reverse filtering command is reserved for testing of the backup path in order to prevent the dramatic disasters caused by hidden failures. To achieve this, with the switching structure of the invention, testing cells can be periodically injected in the structure and are then transmitted through the backup switch path in order to ensure the good operation of the latter. This entails the important advantage of allowing a complete testing of the backup components of the backup path, including the backup SCAL Xmit elements and all the backup links, to make sure that, when a breakdown happens on one side of the switching architecture, that the remaining switch core will be able to switch the total cell traffic.

Additionally, since the two switch cores are based on a output shared buffer architecture, as shown in FIG. 3, the active and backup path arrangement in accordance with the present invention permits virtually increasing the size of the shared cell storage insofar as this cell storage is used by a lower number of output ports. This strongly improves the overall performance of the switch.

The invention is enhanced by an additional mechanism which permits avoiding a situation in which two cells, a first direct cell carrying normal traffic and a second reverse testing cell, simultaneously arrive at the same port adapter Xmit. This is achieved by means a control bus 40-*j* in FIG. 1 connecting the SCAL Xmit element 12-*j*, belonging to the switch fabric 10, to the SCAL Xmit element 22-*j* belonging to the switch fabric 20. Therefore, two corresponding active and backup SCAL Xmit elements which are connected to a same port adapter Xmit can communicate via the same control bus 40-*j*.

As shown in FIG. 2, bus 40 has two main functions: a fist function consisting of the synchronization of the cell clock of the backup SCAL Xmit element 22-*m*, for instance, with that of the clock of the active SCAL Xmit element 12-*m*. In other words, the two links 34-*m* and 35-*m* have cell clocks which we synchronized. The characteristics of transmission of the two busses 34-*m* and 35-*m* ensures that tie synchronism is maintained up to the input of the port adapter Xmit 31-*m*, which is generally the case when links 34-*m* and 35-*m* have the same physical length. When the backup SCAL Xmit element 22-*m* wishes to transmit a cell on bus 35-*m*, the latter sends a request on bus 40*m* to its associated active SCAL Xmit element 12-*m*. That request is received by active SCAL Xmit element 12-*m* which inhibits the transmission of the cell which would normally be transmitted at the next cell cycle. Concurrently active SCAL Xmit element 12-*m* produces an acknowledge signal to its associated bade SCAL Xmit element 22-*m* on bus 40*a*, which informs the latter that it is allowed to use the link 35-*m* to convey the pending cell at the next cell cycle. Each of the above two active and backup mechanisms are enabled in response to the contents of a register that defines, under control of the node manager, the appropriate status of the SCAL Xmit element. The mechanism thus prevents the simultaneous arrival of two cells at the same port adapter hit and entails a substantial advantage since the port adapter Xmit can be designed to support only its nominal throughput. Without this mechanism it would have been necessary to use adapters capable of supporting at least twice the nominal throughput, which would have strongly increased the cost and complexity.

The process in accordance with the present invention permits the effective reconfiguration of the switching architecture when a failure or a breakdown occurs on one physical entity. As shown above, each element in one path, e.g. the left path, is associated with a peer element which is intended to serve as a backup in case of individual breakdown. This is achieved as described below.

Consider now some breakdowns that may occur in the switching architecture. For clarity's sake we will consider all the breakdowns that might occur in the left path, and describe the particular procedures in accordance with the present invention to arrange the backup traffic. Obviously, the same procedures could apply if the breakdowns occur in the opposite right group.

I. Processing of the SCAL Receive Element Breakdown.

The SCAL receive element 11-*i* is likely to be the subject of a breakdown condition resulting from a detection of an error by the control processor, by the watchdog mechanism, by a power supply checker or by a card removal. In those situations, the SCAL receive element is so wired or so designed for disabling all external transmissions, particularly the data transfer on the bus 13-*i* which is stopped. Therefore every cell which is generated by the port adapter receive 30-*i* will be dropped by the SCAL receive element 11-*i*. The In_Service control lead of bus 50-*i* is also dropped.

That change in the In_Service control lead is detected by the peer SCAL receive element 21-*i*. From that instant, the peer SCAL receive element modifies the two bits of the Filtering Control field in the SRH of every cell incoming from the bus 33-*i*. The value is changed from the Direct Filtering command to a No_Filtering command. As a result any cell which is generated by port adapter 30-*i*, and received by SCAL receive element 21-*i* on bus 33-*i*, will be propagated through the right switch fabric 20 with a No_Filtering command. When such a cell is to be transmitted to a port adapter that belongs to the right group, (e.g. adapter 31-*n*), the cell is propagated through the SCAL Xmit element active 22-*n*. Conversely, when the cell is to be transmitted to a port adapter belonging to the left group, the propagation will be made via SCAL Xmit element backup 22-*m*. This is achieved by means of bus 40-*m* which permits only one cell to arrive at the input of port adapter Xmit 31-*m*.

Therefore, it appears that the cell arriving at the left port adapter Xmit 31-*m* may come from two busses: (1) 34-*m* when the cells come from a port adapter 30-*i* which is connected to two SCAL receive elements 11-*i* and 21-*i* which are both normally operational, and (2) the bus 35-*m* when a the cells come from a particular port adapter 30-*i* which is connected to a SCAL receive element that has fallen into an error condition.

II. Processing of an Error Occurring in the Switch Core 15

Similarly as above, the switch core 15 shall be considered as falling into a breakdown condition in response to the detection of an error by the control processor, by the watchdog mechanism, by a power supply checker or by a card removal. In those situations the switch core is so designed for disabling all external transmissions, particularly the data transfer on the busses 14-*m* or 14-*n* which are stopped, resulting in every cell generated by the port adapter receive element 30-*i* being dropped by the switch core 15. The In_Service control lead of bus 60 is also dropped.

That change in the In_Service control lead of bus 60 is detected by the peer switch core 25, which modifies its filtering mask register to set it to an "all ones" value. Therefore, any cell which is generated by port adapter 30-*i*, and received by switch core 25 with a Direct Filtering command, will be propagated through the bus 24-*n* or 24-*m* in accordance with the destination carried by the bit map.

When such a cell is to be transmitted to a port adapter that belongs to the right group, (e.g. adapter 31-*n*), the cell is propagated through the SCAL Xmit element active 22-*n*. Conversely, when the cell is to be transmitted to a port adapter belonging to the left group, the propagation will be made via SCAL Xmit element backup 22-*m*. This is achieved by means of bus 40-*m* which permits only one cell to arrive at the input of port adapter Xmit 31-*m*. Therefore, it appears that the cell arriving at the left port adapter Xmit 31-*m* will be carried by the bus 35-*m* and, conversely, the same cell arriving at a right port adapter Xmit 31-*n* will be carried by the bus 35-*n*.

Figure 5:
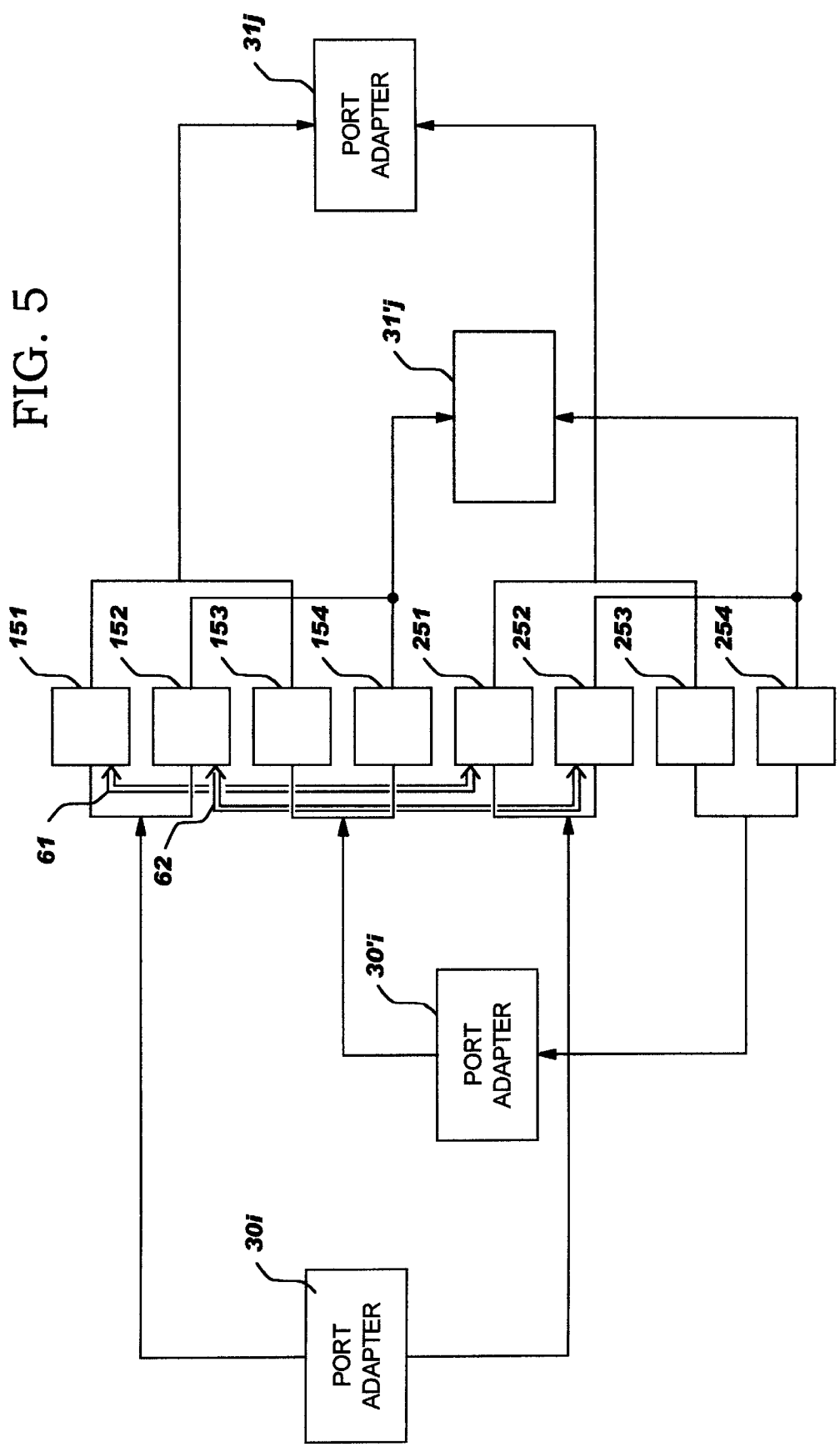
FIG. 5 shows the implementation of the invention in a port expansion architecture.

It should be noted tat the invention may be advantageously used when the switching architecture is based on a port expansion aritecture, as shown in FIG. 5. Such a port expansion architecture is fully described in the patent application (IBM Docket FR997047, Ser. No. 09/121,992), and the contents of which are incorporated herein by simple reference. In a port mansion architecture, the number of ports can be multiplied by two when the switch core is based on a set of four individual switch core elements, which results in a set of 8 elements when considering the right and the left switch fabrics. FIG. 5 illustrates such a combination of individual switch cores 151–154 for the left switch fabric, and 251–254 for the right switch fabric. Since the number of ports is multiplied by two, new port adapters receive 30'-*i* can be connected to the input of the switching architecture in addition to the already existing port adapter receive 30-*i*. Similarly, port adapters Xmit 31'-*j* can be added in addition to the port adapter Xmit 31-*j*. With the teaching of the invention the peer elements are connected, similarly to the arrangement described above, by means of buses similar to bus 60. Indeed, switch cores 151 and 251 are connected via a bus 61 which is represented in the figure. Switch cores 152 and 252 are connected via a bus 62, etc. When a switch core element falls into a breakdown condition, e.g. core 151, which is reported on the bus 61 to the peer switch core 251, the peer switch core modifies its filtering mask register to set it to an "all ones" value. Therefore, any cell which is generated by port adapter 31-*i*, and received by switch core 251 with a Direct Filtering command, will be propagated to port adapted Xmit 31-*j* through the bus 35-*j*, whichever the group to which the port adapter 31-*j* belongs. In other words, for that cell, the transport will be achieved through core 251 whatever the direction of the cell. For the other cells, involving a pair of cores each being operational, the transport of the cell is performed in accordance with the destination group of the cell: if the destination is a port adapter belonging to the right group, the cell will be routed through a core of the group 251–254, while the group 152–154 will be involved if the port adapter is in the left group.

III. Processing of an Error Occurring on a Bus 13-*i*.

Figure 6:
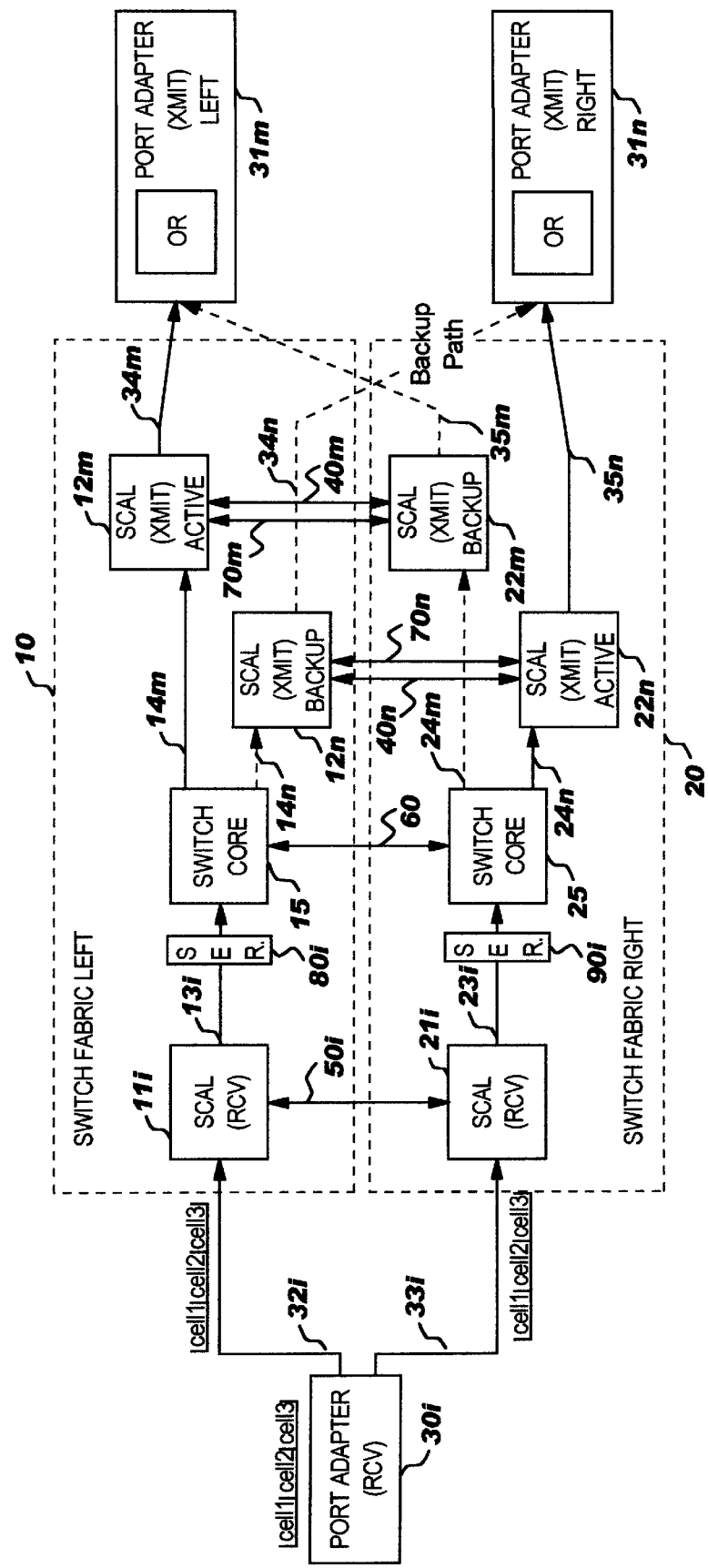

It should be noted bus 13-*i* (and 23-*i*) as represented in FIG. 6 particularly introduces a set of serialize and deserializers 80-*i* (and 90-*i*, respectively) as described in greater detail in the above-mentioned patent applications. The error detecting means that are introduced in that bus e.g. an 8B/10B code, will be used by switch core 15 for detecting the occurrence of an erroneous condition. However, other means such as "keep alive" messages as mentioned above could be used for periodically checking the good condition of that particular hardware component. When switch core 15 detects the occurrence of an error condition (in port number #6 for instance), the switch core causes the disabling of the corresponding input port in order to avoid the propagation of error cells. The switch core 15 then transmits on the data lead of bus 60 a message to the switch core 25 which informs switch core 25 of the detection of the error and its nature. Switch core 25 which on the output port of the same order (with respect to the one having failed, i.e., port number #6) an in_band control message located in the payload of the cell to the SCAL Xmit element number #6. It should be noted that in the teaching of the present invention, SCAL elements and the switch cores can be located in different physical areas and the distance between them may go up to several hundred meters. Each port of the switching architecture may thus be connected to a different physical area via an appropriate bus 24-j which can advantageously use some high-speed serializing means. The in-band message permits avoiding the multiplication of control leads when long distances are involved between the switch cores and the SCAL elements and which would make more costly the design of the overall switching architecture. In the implementation of the invention, SCAL Xmit element number #6 is located in the same physical entity as the SCAL receive element number #6 and are under the control of the same control processor. When the above mentioned in_band message is received by the control processor that is common to both the SCAL Xmit and SCAL receive elements, the control processor sets the SCAL receive element into a state wherein the two bits of the Filtering Control field are modified in the SRH of every incoming cell from the bus 33-i. In the SCAL receive element the value of the Filtering Control field is changed from the Direct Filtering command to a No_Filtering command. This means that any cell which is generated by port adapter 30-i, and received by SCAL receive element 21-i on bus 33-i, will be propagated trough the switch fabric right 20 with a No_Filtering command. When such a cell is to be transmitted to a port adapter that belongs to the right group, (e.g. aer 31-n), the cell is propagated through the SCAL Xmit element active 22-n. Conversely, when the cell is to be transmitted to a port adapter belonging to the left group, the propagation will be made via SCAL Xmit element backup 22-m. This is achieved by means of bus 40-m which permits only one cell to arrive at the input of port adapter Xmit 31-m.

Therefore, it appears that the cell arriving at the left port adapter Xmit 31-m may come from two busses: 34-m when the cells comes from a port adapter 30-i which is connected through two busses 13-i and 23-i which are both normally operational, and the bus 35-m when the cells come from a particular port adapter 30-i which is connected to a bus 13-i which has fallen into the error condition.

IV. Processing of an Error Occurring in Active SCAL Xmit Active 12-m or on the Bus 14-m.

In the event that the error condition is detected as mentioned above by using the numerous error detection mechanisms that are used in active SCAL Xmit element 12-m for detecting an internal failure, or which may detect a problem on the bus 14-m in a similar fashion as that described with respect to the bus 13-i. Let us assume that SCAL Xmit element number #6 has made such an error detection.

In response to that detection, the SCAL Xmit element 12-6 drops the In-Service control lead in bus 70-6 and causes its deactivation so that bus 34-6 stops any transmission of data. The control processor being common to the SCAL Xmit and SCAL receive elements 22-6 and 21-6 sets the SCAL Xmit element 22-6 in such an active state in order to permit the latter to transmit data on bus 35-6 without requiring the authorization of the failing peer element through bus 40-6.

Simultaneously, the control processor transmits through the SCAL receive 21-6 an in_band control message to the switch core 25 which may be remotely located. Upon reception of that in_band message, the control processor inside switch core 25 modifies the filtering mask register to set to one the bits corresponding to the output port number #6, causing the bus 24-6 to become active. This results in the port adapter Xmit 31-6 belonging to the left group, which previously received the cells from bus 34-6, now receiving all the cells from bus 35-6.

What is claimed:

1. A fault tolerant switching architecture comprising a first and a second switch fabric each including a switch core element respectively locked in a centralized building and a set of Switch Core Access Layer (SCAL) elements distributed in different physical area; each SCAL element respectively comprising a SCAL receive element and a SCAL transmit element for enabling access to a corresponding input and output port of the corresponding switch core;

a set of port adapters, each being connected to said first and second switch fabrics via a particular SCAL element so that each switch core receives a sequence of cells coming from any port adapter and conversely any port adapter may receive cells of the sequence of cells from either one of said switch cores;

wherein each element of each switch fabric comprises means for detecting an internal failure condition in the element and means for transferring an error control signal to a peer element in the other switch fabric; and each switch fabric comprises means for routing cells of the sequence of cells in place of the other switch fabric upon receiving said error control signal.

2. The switching architecture according to claim 1 wherein each of said switch cores comprises:

means for extracting a Switch Routing Header (SRH) from a cell from the sequence of cells entering said switch core;

means for addressing a routing table with the contents of said SRH to obtain a bit map value indicating the output ports to which the cell should be routed;

means for controlling the routing process with an altered value of the bit map.

3. The switching architecture according to claim 2 wherein a controllable masking mechanism associated with each switch core is controlled by the value of a Filtering Control field which is extracted from the SRH contained in the cell, and wherein each SCAL receive element comprises means for altering the value of said Filtering Control field in response to the detection of an error control signal received from a peer SCAL receive element in the other switch fabric, enabling the cell to be routed by the other switch fabric.

4. The switching architecture according to claim 3 wherein communication between the SCAL elements and the switch cores is achieved by a serializing means using an 8B/10B code permitting additional error detection by each switch core, said error detection being reported to the peer switch core for the purpose of controlling its controllable masking mechanism.

5. The switching architecture according to claim 4 wherein each switch fabric element includes a processor having means for performing an automatic diagnosis and a watchdog restart mechanism used for generating a general reset of the processor if the processor is in a hang-up situation that is interpreted as a malfunction.

6. The switching architecture according to claim 1 wherein each switch core is a shared buffer switch core.

* * * * *